US012574866B2

(12) United States Patent
Huang et al.

(10) Patent No.: US 12,574,866 B2
(45) Date of Patent: Mar. 10, 2026

(54) METHOD AND APPARATUS FOR POWER CONTROL

(71) Applicant: Telefonaktiebolaget LM Ericsson (publ), Stockholm (SE)

(72) Inventors: Yue Huang, Guangdong (CN); Hao Peng, Guangdong (CN); Yongquan Qiang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 558 days.

(21) Appl. No.: 17/920,523

(22) PCT Filed: Apr. 24, 2020

(86) PCT No.: PCT/CN2020/086709
§ 371 (c)(1),
(2) Date: Oct. 21, 2022

(87) PCT Pub. No.: WO2021/212473
PCT Pub. Date: Oct. 28, 2021

(65) Prior Publication Data
US 2023/0156632 A1 May 18, 2023

(51) Int. Cl.
*H04W 52/42* (2009.01)
*H04W 52/36* (2009.01)

(52) U.S. Cl.
CPC ......... *H04W 52/42* (2013.01); *H04W 52/367* (2013.01)

(58) Field of Classification Search
CPC .............................. H04W 52/42; H04W 52/367
See application file for complete search history.

(56) References Cited

U.S. PATENT DOCUMENTS 9,913,277 B2    3/2018 Liu et al.
9,960,828 B2    5/2018 Petersson et al.
(Continued)

FOREIGN PATENT DOCUMENTS

CN        104254981 A    12/2014
CN        108632857 A    10/2018
(Continued)

OTHER PUBLICATIONS

Extended European Search Report for European Patent Application No. 20932107.4, mailed Oct. 24, 2023, 10 pages.
(Continued)

*Primary Examiner* — Junpeng Chen
(74) *Attorney, Agent, or Firm* — Withrow & Terranova, PLLC

(57) ABSTRACT

Embodiments of the present disclosure provide methods and apparatus for power control. A method at a network node comprises determining a value of power back-off for a first wireless device based on at least one of a number of wireless devices including the first wireless device, wherein the wireless devices including the first wireless device are co-scheduled by the network node and an estimated max power increase in an overlap area where two or more beams are to be overlapped, wherein one of the two or more beams is for the first wireless device. The method further comprises transmitting a message or data over the beam for the first wireless device, wherein an output power of the beam for the first wireless device is controlled based on the value of power back-off for the first wireless device.

15 Claims, 17 Drawing Sheets

(56) References Cited

U.S. PATENT DOCUMENTS

| | | | | |
|---|---|---|---|---|
| 2009/0191910 A1* | 7/2009 | Athalye | ............. | H04W 52/243 |
| | | | | 455/522 |
| 2016/0212749 A1* | 7/2016 | Abraham | ............. | H04W 52/60 |
| 2018/0063799 A1* | 3/2018 | Sadek | ................. | H04W 52/367 |
| 2018/0103428 A1* | 4/2018 | Jiang | ................. | H04W 52/0225 |
| 2018/0331966 A1* | 11/2018 | Lee | ........................ | H04L 67/04 |
| 2020/0028558 A1* | 1/2020 | Yerramalli | .......... | H04B 17/309 |

FOREIGN PATENT DOCUMENTS

| | | | |
|---|---|---|---|
| GB | 2543563 A | 4/2017 |
| WO | 2016054819 A1 | 4/2016 |
| WO | 2017068356 A2 | 4/2017 |
| WO | 2017068356 A3 | 4/2017 |
| WO | 2017196612 A1 | 11/2017 |
| WO | 2019174753 A1 | 9/2019 |

OTHER PUBLICATIONS

First Office Action for Chinese Patent Application No. 202080100091. X, mailed Jan. 9, 2025, 15 pages.

Author Unknown, "Technical Specification Group Radio Access Network; Evolved Universal Terrestrial Radio Access (E-UTRA); Physical layer procedures (Release 16)," Technical Specification 36.213, Version 16.1.0, Mar. 2020, 3GPP Organizational Partners, 570 pages.

Ericsson, et al., "T doc R2-110941: Power Management indication in Phr," 3GPP TSG-RAN WG2#73, Feb. 21-25, 2011, Taipei, Taiwan, 3 pages.

International Search Report and Written Opinion for International Patent Application No. PCT/CN2020/086709, mailed Jan. 26, 2021, 10 pages.

\* cited by examiner

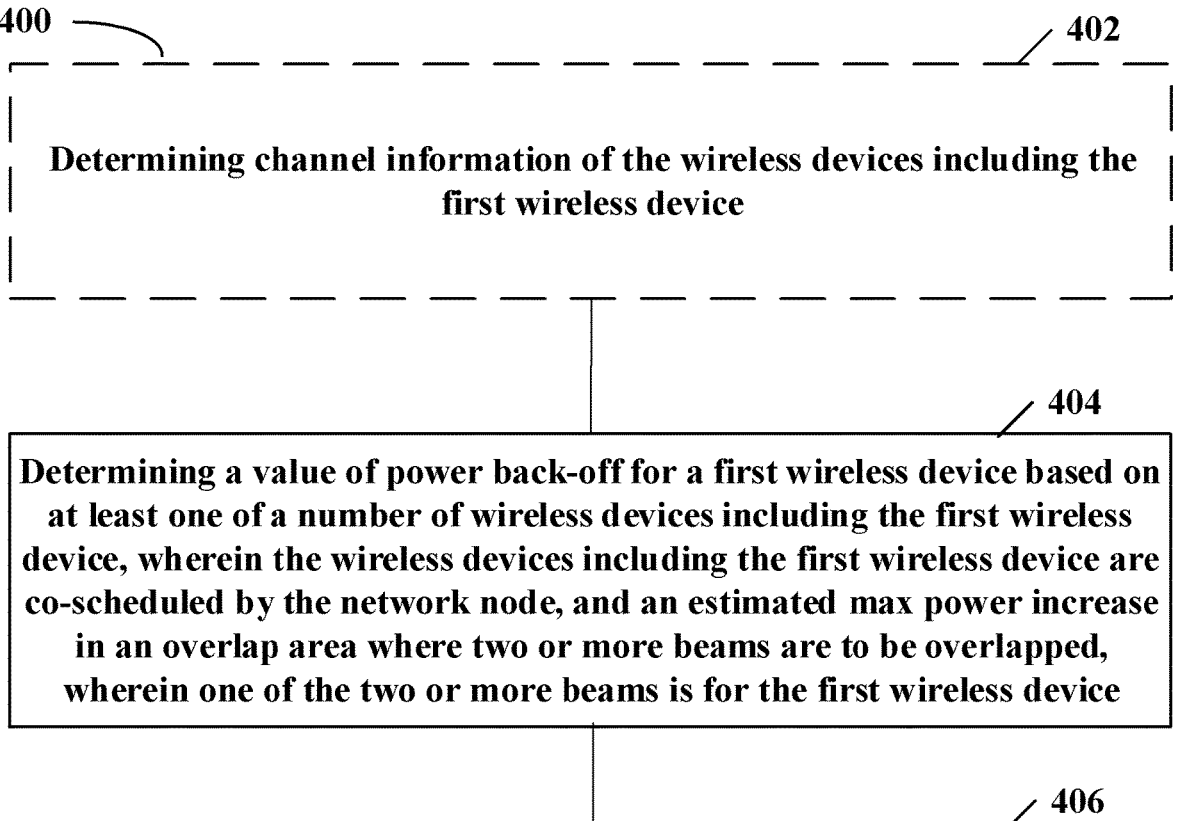

400

402

Determining channel information of the wireless devices including the
first wireless device

404

Determining a value of power back-off for a first wireless device based on
at least one of a number of wireless devices including the first wireless
device, wherein the wireless devices including the first wireless device are
co-scheduled by the network node, and an estimated max power increase
in an overlap area where two or more beams are to be overlapped,
wherein one of the two or more beams is for the first wireless device

406

Transmitting a message or data over the beam for the first wireless
device, wherein an output power of the beam for the first wireless device
is controlled based on the value of power back-off for the first wireless
device

FIG. 4

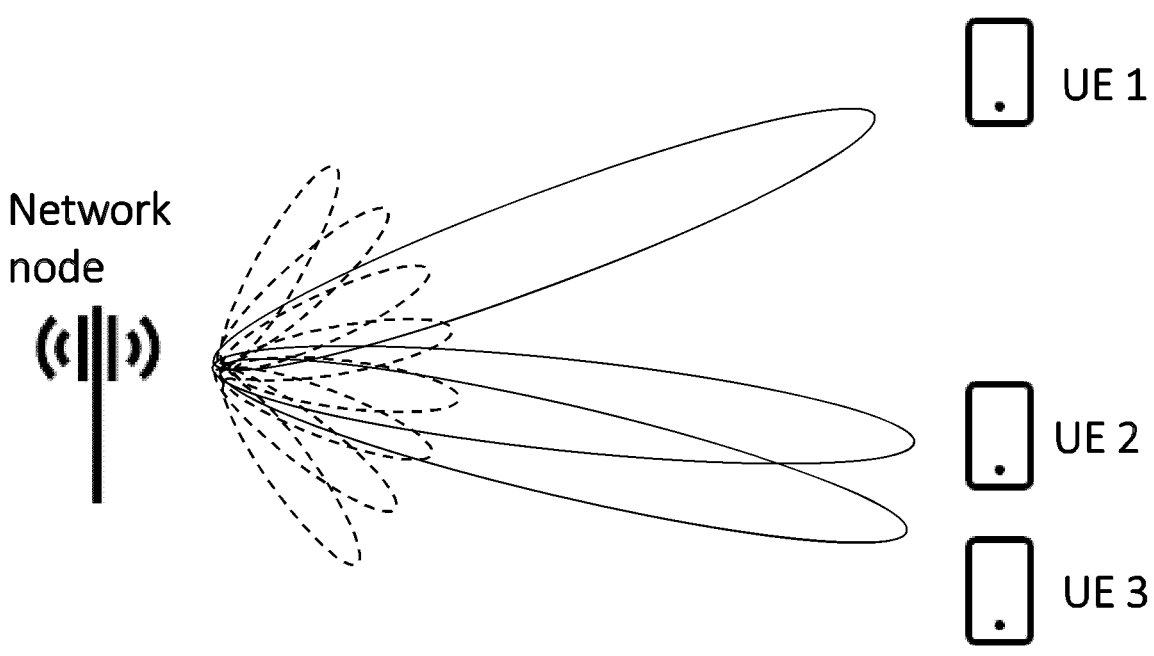
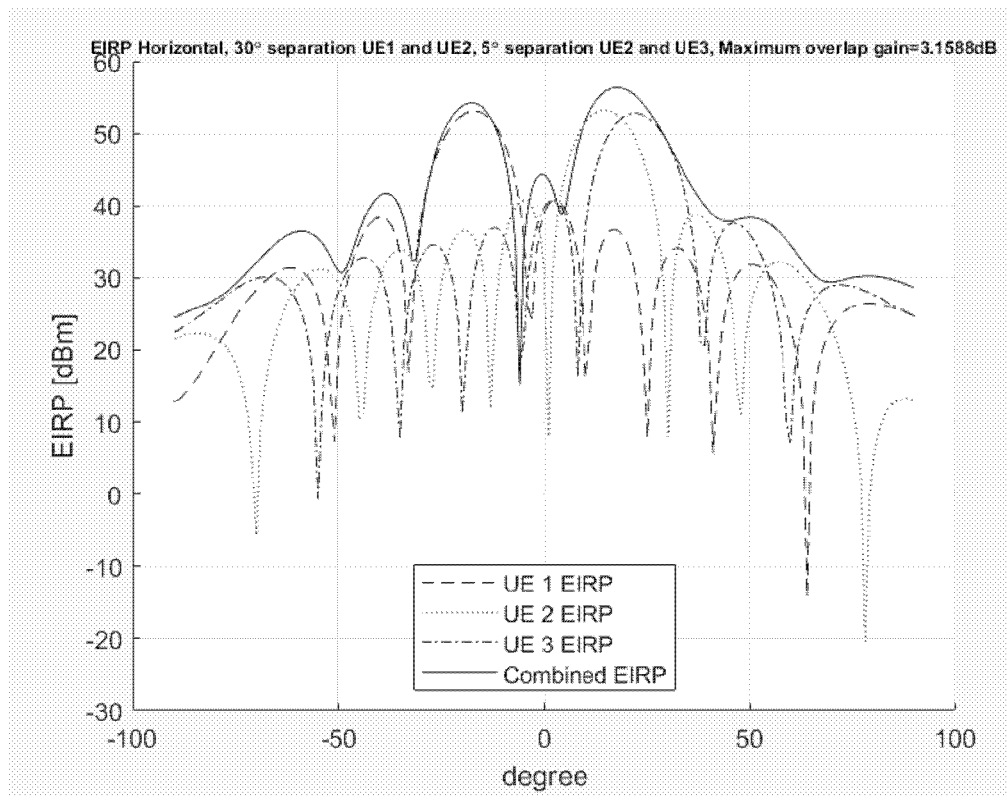
FIG. 5a

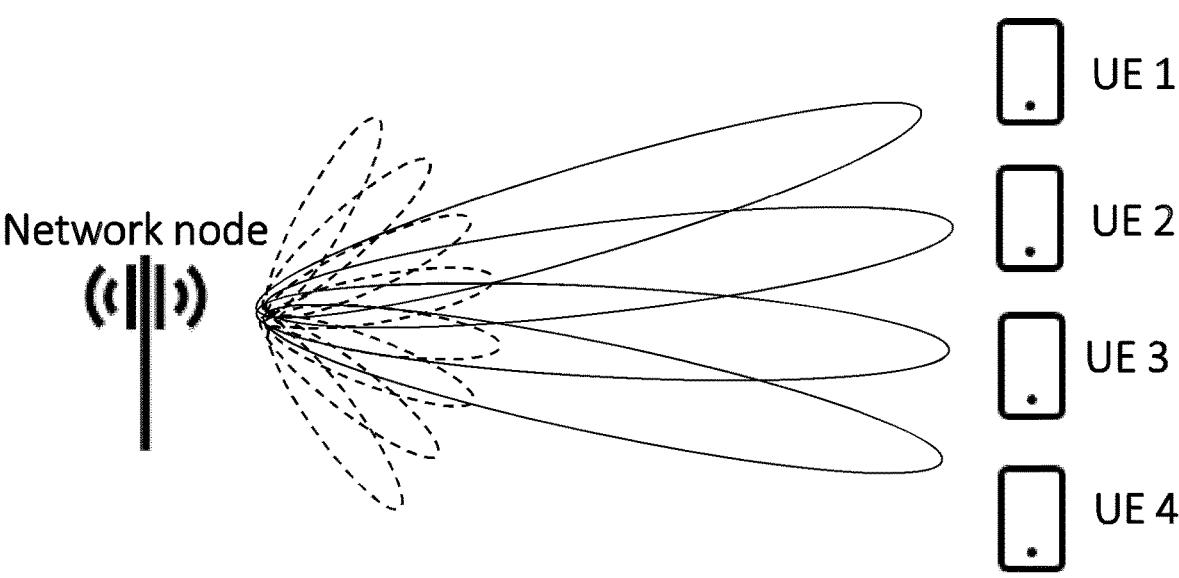
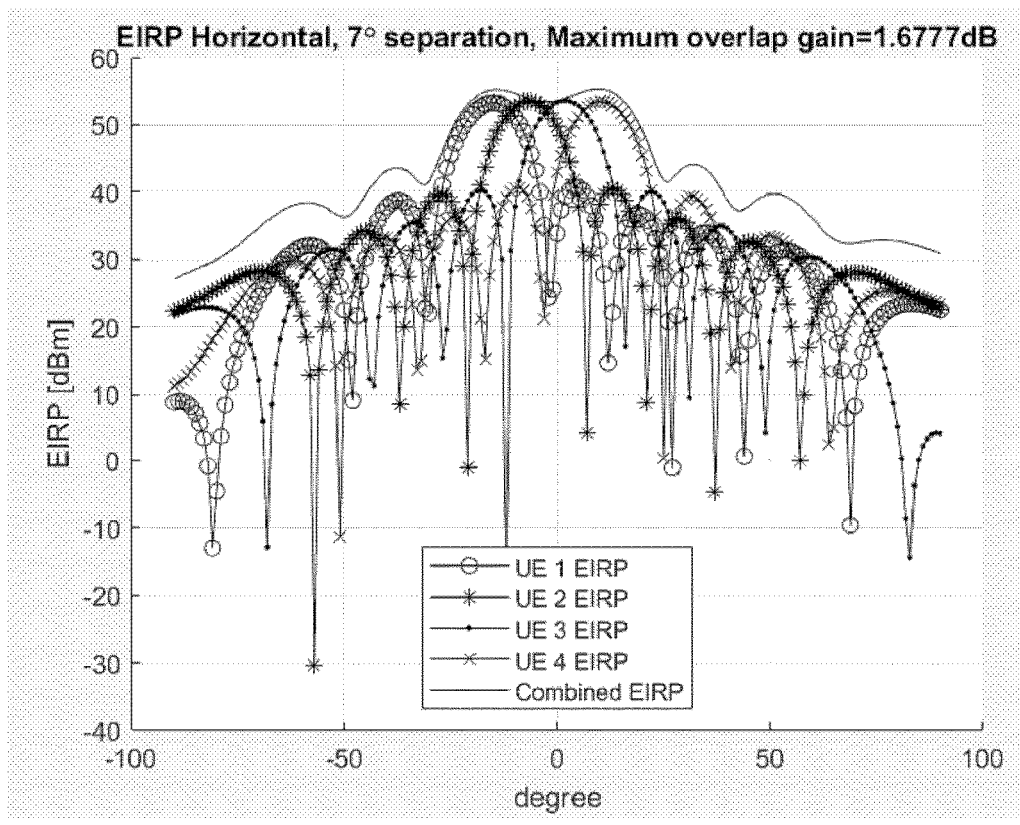
FIG. 5b

700

702

Transmitting at least one reference signal to the network node

704

Receiving a message or data over a beam for the first wireless device from a network node; wherein an output power of the beam for the first wireless device is controlled based on a value of power back-off for the first wireless device, wherein the value of power back-off for the first wireless device is determined based on at least one of a number of wireless devices including the first wireless device, wherein the wireless devices including the first wireless device are co-scheduled by the network node, and an estimated max power increase in an overlap area where two or more beams are to be overlapped, wherein one of the two or more beams is for the first wireless device

FIG. 7

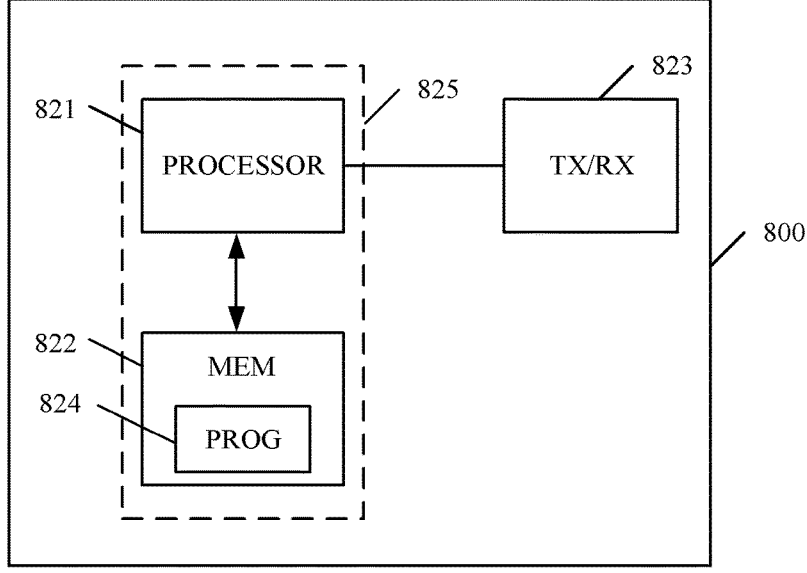

Determining module 852

Transmitting module 854

FIG. 8b

METHOD AND APPARATUS FOR POWER CONTROL

This application is a 35 U.S.C. § 371 national phase filing of International Application No. PCT/CN2020/086709, filed Apr. 24, 2020, the disclosure of which is incorporated herein by reference in its entirety.

TECHNICAL FIELD

The present disclosure relates generally to the technology of wireless communication, and in particular, to methods and apparatuses for power control.

BACKGROUND

This section introduces aspects that may facilitate better understanding of the present disclosure. Accordingly, the statements of this section are to be read in this light and are not to be understood as admissions about what is in the prior art or what is not in the prior art.

In a wireless communication system, beamforming may be used to reinforce a power of a signal, with a help of antenna array and massive MIMO (Multi Input Multi Output). In the beamforming, the antenna array may adjust its phase and power when sending signals, to form an electromagnetic wave "beam" from the antenna array to multiple user equipments (UEs). The stronger the beam power is, the clearer signal and power gain the UE can receive.

However, in many scenarios, it's not encouraged to make the beam power too strong. Too strong beam power may cause strong interference to other wireless devices. On the other hand, there may be some regulatory rules to restrict UE perceived EIRP (Effective Isotropic Radiated Power) not exceed a certain limit. For example, the exposure limitation may be based on the guidelines from the International Commission on Non-Ionizing Radiation Protection (IC-NIRP), but it may take different forms in different countries and regions.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A traditional/legacy method of the EIRP control is to limit a transmission power of the antenna array. This means that the transmission power of the antenna array is fixed and shared for all UEs served by the antenna array. This may cause some problems. For example, normally the UE-specific beamforming gain (traffic channel) is larger than the broadcast beamforming gain (broadcast channel). To accommodate a unified EIRP regulation, some transmission modes (TM) as described in 3rd generation partnership project (3GPP) TS 36.213 V16.1.0 (the disclosure of which is incorporated by reference herein in its entirety), such as TM7/8/9 SU-MIMO (Single User MIMO), may not be allowed otherwise the EIRP may exceed the limit. Therefore only some TMs such as TM3/4 may be used. It may cause a performance degradation in cell edge areas.

In order to ensure wireless equipment performance and respect the EIRP limit, the transmission power of the antenna array may rely on the max antenna gain of UE-specific beams. While under this configuration, the cell coverage may be impacted and reduced which in turn may result in more call drops.

In addition, if there are multiple UEs scheduled (e.g., MU-MIMO (multi user MIMO)), each UE may take a share (such as same share) from total configured transmission power. As the transmission power of the antenna array is limited by the single UE case, obviously each UE cannot reach its max allowed EIRP, yielding not best performance in this case.

Some solutions do not allow the SU-MIMO and just allow MU-MIMO scheduling when the number of UEs is over than a threshold, in order to control each UE's EIRP within the limit (e.g., the transmission power of the antenna array may be evenly distributed among all co-scheduled wireless devices in this case). It may lose MU-MIMO opportunity to some extend which would cause performance degradation from the whole cell point of view.

When multiple UEs are co-located (e.g., in MU-MIMO case), the beams may have an overlap area in which the EIRP may be even higher. To respect the EIRP limit, additional penalty may be necessary. Some solutions just simply apply for additional 3 dB of power back-off for all MU-MIMO cases. But it is not necessary if the UEs have good angular separation.

To overcome or mitigate at least one of the above mentioned problems or other problems, embodiments of the present disclosure propose an improved power control solution.

A first aspect of the present disclosure provides a method at a network node. The method comprises determining a value of power back-off for a first wireless device based on at least one of a number of wireless devices including the first wireless device, wherein the wireless devices including the first wireless device are co-scheduled by the network node, and an estimated max power increase in an overlap area where two or more beams are to be overlapped, wherein one of the two or more beams is for the first wireless device. The method further comprises transmitting a message or data over the beam for the first wireless device, wherein an output power of the beam for the first wireless device is controlled based on the value of power back-off for the first wireless device.

In embodiments of the present disclosure, the value of power back-off for the first wireless device may be determined further based on effective isotropic radiated power (EIRP) max and EIRP limit, wherein the EIRP max indicates a maximum value of EIRP of the first wireless device and the EIRP limit indicates a limit value of EIRP.

In embodiments of the present disclosure, the number of wireless devices including the first wireless device may be used to quantify a compensation of power back-off when beamforming is used for the wireless devices.

In embodiments of the present disclosure, the estimated max power increase in the overlap area may be determined by a table indicating an association between the estimated max power increase in the overlap area and at least one beamforming parameter.

In embodiments of the present disclosure, the estimated max power increase in the overlap area or the table may be determined by simulation or testing.

In embodiments of the present disclosure, the at least one beamforming parameter may comprise at least one of an orthogonality factor between two or more beams for respective wireless devices in the overlap area; and a beam angular separation.

In embodiments of the present disclosure, the value of power back-off for the first wireless device may be determined in a scheduling interval.

In embodiments of the present disclosure, the first wireless device may be in a multiuser multiple input multiple output, MU-MIMO, mode.

In embodiments of the present disclosure, the method may further comprise determining channel information of the wireless devices including the first wireless device.

In embodiments of the present disclosure, the network node may be a base station and/or the wireless devices may be terminal devices.

A second aspect of the present disclosure provides a method implemented at a first wireless device. The method comprises receiving a message or data over a beam for the first wireless device from a network node. An output power of the beam for the first wireless device is controlled based on a value of power back-off for the first wireless device. The value of power back-off for the first wireless device is determined based on at least one of a number of wireless devices including the first wireless device, wherein the wireless devices including the first wireless device are co-scheduled by the network node, and an estimated max power increase in an overlap area where two or more beams are to be overlapped, wherein one of the two or more beams is for the first wireless device.

In embodiments of the present disclosure, the method may further comprise transmit at least one reference signal to the network node.

A third aspect of the present disclosure provides a network node. The network node comprises a processor; and a memory, the memory containing instructions executable by the processor, whereby the network node is operative to determine a value of power back-off for a first wireless device based on at least one of a number of wireless devices including the first wireless device, wherein the wireless devices including the first wireless device are co-scheduled by the network node, and an estimated max power increase in an overlap area where two or more beams are to be overlapped, wherein one of the two or more beams is for the first wireless device. The network node is further operative to transmit a message or data over the beam for the first wireless device, wherein an output power of the beam for the first wireless device is controlled based on the value of power back-off for the first wireless device.

A fourth aspect of the present disclosure provides a first wireless device. The first wireless device comprises a processor; and a memory, the memory containing instructions executable by the processor, whereby the first wireless device is operative to receive a message or data over a beam for the first wireless device from a network node. An output power of the beam for the first wireless device is controlled based on a value of power back-off for the first wireless device. The value of power back-off for the first wireless device is determined based on at least one of a number of wireless devices including the first wireless device, wherein the wireless devices including the first wireless device are co-scheduled by the network node, and an estimated max power increase in an overlap area where two or more beams are to be overlapped, wherein one of the two or more beams is for the first wireless device.

A fifth aspect of the present disclosure provides a network node. The network node comprises a determining module and a transmitting module. The determining module may be configured to determine a value of power back-off for a first wireless device based on at least one of a number of wireless devices including the first wireless device, wherein the wireless devices including the first wireless device are co-scheduled by the network node and an estimated max power increase in an overlap area where two or more beams are to be overlapped, wherein one of the two or more beams is for the first wireless device. The transmitting module may be configured to transmit a message or data over the beam for the first wireless device, wherein an output power of the beam for the first wireless device is controlled based on the value of power back-off for the first wireless device.

A sixth aspect of the present disclosure provides a first wireless device. The first wireless device comprises a receiving module. The receiving module may be configured to receive a message or data over a beam for the first wireless device from a network node. An output power of the beam for the first wireless device is controlled based on a value of power back-off for the first wireless device. The value of power back-off for the first wireless device is determined based on at least one of a number of wireless devices including the first wireless device, wherein the wireless devices including the first wireless device are co-scheduled by the network node, and an estimated max power increase in an overlap area where two or more beams are to be overlapped, wherein one of the two or more beams is for the first wireless device.

In embodiments of the present disclosure, the first wireless device may further comprise a transmitting module. The transmitting module may be configured to transmit at least one reference signal to the network node.

A seventh aspect of the present disclosure provides a computer program product comprising instructions which, when executed on at least one processor, cause the at least one processor to carry out any of the methods according to the first and second aspects of the disclosure.

An eighth aspect of the present disclosure provides a communication system including a host computer including: processing circuitry configured to provide user data; and a communication interface configured to forward the user data to a cellular network for transmission to a terminal device. The cellular network includes a network node above mentioned, and/or the terminal device is above mentioned.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

A ninth aspect of the present disclosure provides a communication system including a host computer including: a communication interface configured to receive user data originating from a transmission from a terminal device; a network node. The transmission is from the terminal device to the network node. The network node is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

A tenth aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node which may perform any step of the method according to the second aspect of the present disclosure.

An eleventh aspect of the present disclosure provides a communication system including a host computer. The host computer may comprise processing circuitry configured to provide user data, and a communication interface configured to forward the user data to a cellular network for transmission to a UE. The cellular network may comprise a network node having a radio interface and processing circuitry. The network node's processing circuitry may be configured to perform any step of the method according to the second aspect of the present disclosure.

A twelfth aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node. The UE may perform any step of the method according to the first aspect of the present disclosure.

A thirteenth aspect of the present disclosure provides a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

A fourteenth aspect of the present disclosure provides a method implemented in a communication system which may include a host computer, a network node and a UE. The method may comprise, at the host computer, receiving user data transmitted to the network node from the UE which may perform any step of the method according to the first aspect of the present disclosure.

A fifteenth aspect of the present disclosure provides a communication system including a host computer. The host computer may comprise a communication interface configured to receive user data originating from a transmission from a UE to a network node. The UE may comprise a radio interface and processing circuitry. The UE's processing circuitry may be configured to perform any step of the method according to the first aspect of the present disclosure.

A sixteenth aspect of the present disclosure provides a method implemented in a communication system which may include a host computer, a network node and a UE. The method may comprise, at the host computer, receiving, from the network node, user data originating from a transmission which the network node has received from the UE. The network node may perform any step of the method according to the second aspect of the present disclosure.

A seventeenth aspect of the present disclosure provides a communication system which may include a host computer. The host computer may comprise a communication interface configured to receive user data originating from a transmission from a UE to a network node. The network node may comprise a radio interface and processing circuitry. The network node's processing circuitry may be configured to perform any step of the method according to the second aspect of the present disclosure.

An eighteenth aspect of the present disclosure provides a computer-readable storage medium storing instructions which, when executed on at least one processor, cause the at least one processor to carry out any of the methods according to the first and second aspects of the disclosure.

Embodiments herein afford many advantages, of which a non-exhaustive list of examples follows. In some embodiments herein, TM7/8/9 SU-MIMO (beamforming) may be allowed to improve cell edge performance, compared to using TM3/4. In some embodiments herein, MU-MIMO may not be limited by the number of paired UEs. Even there are only 2 UEs, MU-MIMO can still work. In some embodiments herein, in the case of MU-MIMO, each UE can reach its max allowed EIRP regardless of how many UEs got paired, to ensure its performance. In some embodiments herein, even in the beam overlap areas (e.g., some UEs are very close to each other), the total EIRP may be still under control. In some embodiments herein, no blindly overlap penalty may be applied. The embodiments herein are not limited to the features and advantages mentioned above. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 4 shows a flowchart of a method according to an embodiment of the present disclosure;

FIG. 5a shows an example of beam overlap illustration according to an embodiment of the present disclosure;

FIG. 5b shows an example of beam overlap illustration according to another embodiment of the present disclosure;

FIG. 7 shows a flowchart of a method according to another embodiment of the present disclosure;

FIG. 8a is a block diagram showing an apparatus suitable for practicing some embodiments of the disclosure;

FIG. 8b is a block diagram showing a network node according to an embodiment of the disclosure;

DETAILED DESCRIPTION

Figure 1:
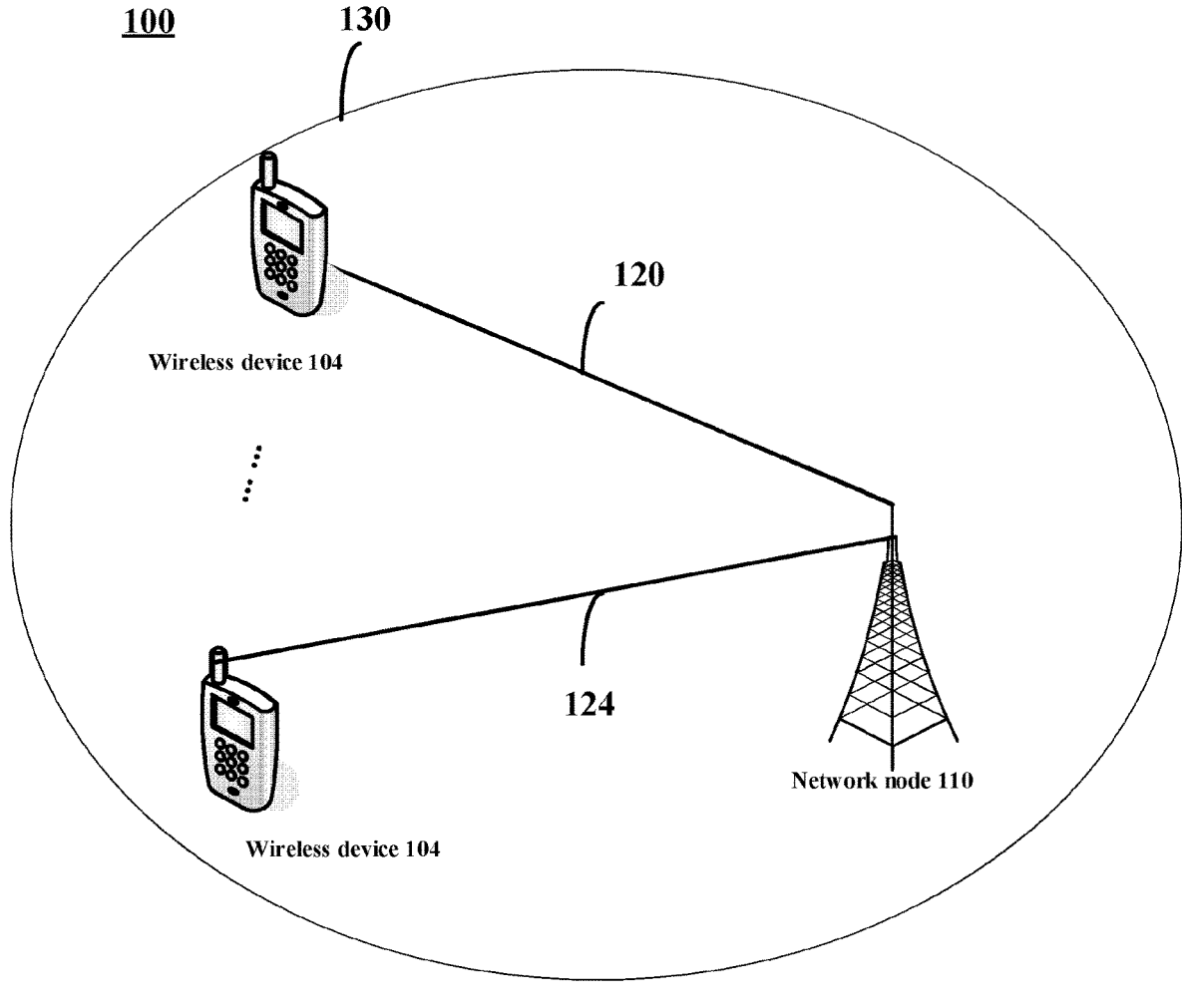
FIG. 1 depicts a schematic system, in which some embodiments of the present disclosure can be implemented.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "network node" or "network side node" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

FIG. 1 depicts a schematic system, in which some embodiments of the present disclosure can be implemented. As shown in FIG. 1, the system 100 comprises a network node 110. For example, the network node 110 may refer to function elements on the network side as compared to a user equipment. For example, the network node 110 may be a network node such as an eNB, a gNB, a Home eNode B, a femto Base Station (BS), a pico BS or any other node capable to serve one or more wireless devices in the system 100. The solid lines 120 and 124 indicate desired transmissions between the wireless devices and the network node 110 on the downlink and uplink. It is well known that a cellular radio system may comprise a network of radio cells each served by a transmitting station, known as a cell site or base transceiver station. The radio network provides wireless communications service for a plurality of transceivers (in most cases mobile). The network of network nodes working in collaboration allows for wireless service which is greater than the radio coverage provided by a single network node. The individual network node may be connected by another network (in many cases a wired network, not shown), which includes additional controllers for resource management and in some cases access to other network systems (such as the Internet) or metropolitan area networks (MANs). The circle 130 schematically indicates a coverage range of the network node 110. The wireless devices are within the coverage range, therefore the wireless devices may have a direct connection with the network node 110.

In other embodiments, the network node 110 may be a sink node used for collecting information from the wireless devices, or a task node for distributing a task to the wireless devices, or any other suitable functionality node.

The system 100 may further comprise one or more wireless devices 104. For example, the wireless devices 104 may refer to function elements on the terminal side as compared to a network node. For example, the wireless devices 104 may be terminal devices. In some embodiments, the wireless devices 104 may be a wireless relay node for relaying traffic between the network node and other wireless device.

Some embodiments of the present disclosure can be implemented in a telecom massive MIMO radio system.

Figures 2, 3:
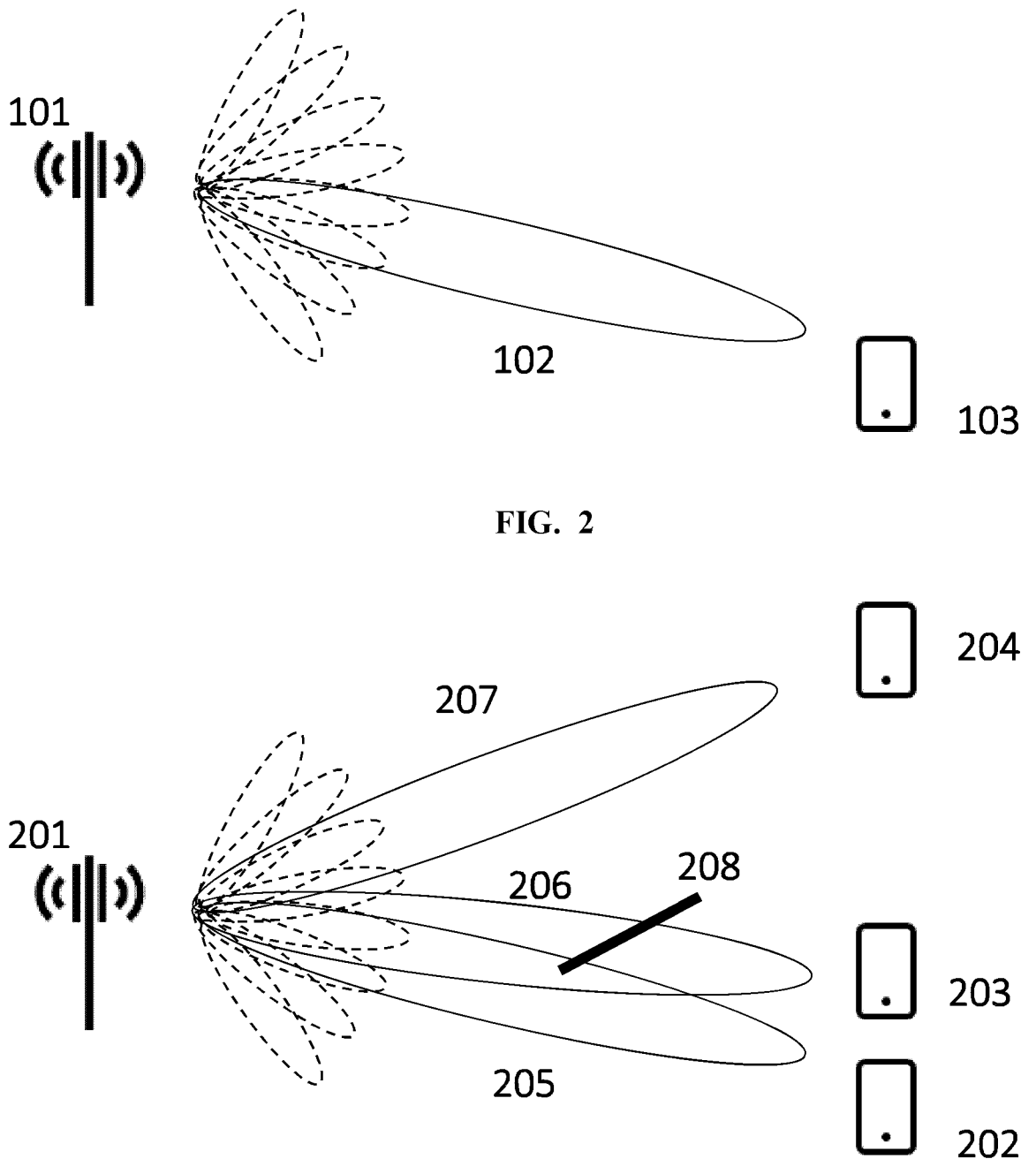
FIG. 2 schematically depicts beam forming for SU-MIMO according to an embodiment of the present disclosure.
FIG. 3 schematically depicts beam forming for MU-MIMO according to an embodiment of the present disclosure.

FIG. 2 schematically depicts beam forming for SU-MIMO. FIG. 3 schematically depicts beam forming for MU-MIMO. In coordination with the FIGS. 1-3, the following detailed description describes some embodiments in both generally and with specific examples. The embodiments presented herein are for illustration purposes only and should not be construed as limiting. With respect to the FIGS. 2-3, for the purpose of illustration, the beam shape means the mainlobe shaping sending data to UEs, ignoring the other sidelobes.

Wireless communication networks include at least one network node, e.g., a base station, which typically transmits downlink (DL) signals to multiple wireless devices and receives uplink (UL) signals from the wireless devices. As shown in FIG. 2, the exemplary wireless network comprises a network node 101 and a wireless device 103. The network node 101 encodes signals for transmission to the wireless device 103 through an antenna array. With the beamforming technique, the wireless signal is encoded and formed up a "beam" by adjusting the amplitude and phase of antennas in the antenna array. Generally speaking, there may be one strongest beam (main lobe) 102 and several side lobes illustrated as dotted lines. From EIRP power point of view, the side lobes have a weaker power than the main lobe. As used herein, the term "beam" refers to the main lobe.

FIG. 3 illustrates a further complex scenario than FIG. 2, that is Multi-User MIMO (MU-MIMO) scenario, in which the downlink data may be sent to multiple wireless devices at the same time. To simplify the FIG. 3, just three wireless devices are shown. In actual case the number of wireless devices could be any certain number bigger the three co-scheduled wireless devices 202, 203 and 204. Among them, two wireless devices 202 and 203 are close to each other in location, while the wireless device 204 is stand alone and far away from the wireless device 202, 203. Because the wireless devices 202, 203, 204 are co-scheduled, the network node 201 can transmit data to these three wireless devices simultaneously. This means there may be three main lobes 205, 206, 207 for the wireless devices 202, 203, 204 correspondingly. In this example, because the wireless devices 202 and 203 are close to each other, the beams 205 and 206 may have an overlap area labeled as 208. The power concentrated in this overlap area 208 may be higher than the non-overlap area.

From EIRP power perspective, if the legacy way of restricting antenna power to a certain level is used, there may be a dilemma. On one hand, when more wireless devices are co-scheduled, each wireless device can get a less power. This means a weaker EIRP power and may be bad for improving SINR (Signal over Interference and Noise rate). On the other hand, if the antenna power is set to a higher level, then in some situation(s) such as SU-MIMO situation, etc., it may exceed the EIRP limit. Another problem is, if the wireless devices are close to each other (like wireless devices 202 and 203 in FIG. 3), the EIRP in the beam overlap would be even higher.

Some embodiments presented herein may address at least one of the above problems by dynamically adjusting the power of the antenna array, so that the power assigned to each wireless device may be strong enough, but do not exceed the EIRP limit (i.e., the limit value of EIRP). The EIRP of wireless devices in the overlap area may not exceed the EIRP limit, by estimating the overlapped power increase.

FIG. 4 shows a flowchart of a method according to an embodiment of the present disclosure, which may be performed by an apparatus implemented in/as a network node or communicatively coupled to the network node. As such, the apparatus may provide means or modules for accomplishing various parts of the method 400 as well as means or modules for accomplishing other processes in conjunction with other components.

At block 402, optionally, the network node may determine channel information of the wireless devices including a first wireless device, wherein the wireless devices including the first wireless device are co-scheduled by the network node. The channel information of the wireless devices may be used for beamforming. The channel information may include any suitable information, such as the direction and/or location of first wireless device. Beamforming is a technique that focuses a wireless signal towards a specific receiving device, rather than having the signal spread in all directions from a broadcast antenna. The network node may determine channel information of the wireless devices in various ways. For example, the network node may determine or obtain the locations of the wireless devices, and then determine the channel information of the wireless devices based on the locations of the wireless devices. As another example, the network node may collect the channel information from all connected wireless devices from respective uplink (UL) signals of the wireless devices. The channel information of the wireless devices may be determined by evaluating the cell reference signal or UE-specific reference signal from the wireless devices. The amplitude and phase difference of different antennas in the antenna array may be collected. After extracting the information, the channel information of the wireless devices can be identified. In the network node, the channel information may be stored so that later downlink (DL) beamforming can use the channel information (such as the direction of the wireless devices) to send back data to the wireless devices by using wireless signal beams.

At block 404, the network node may determine a value of power back-off for the first wireless device based on at least one of (a) a number of wireless devices including the first wireless device, wherein the wireless devices including the first wireless device are co-scheduled by the network node and (b) an estimated max power increase in an overlap area where two or more beams are to be overlapped. One of the two or more beams is for the first wireless device.

In an embodiment, the number of wireless devices including the first wireless device may be used to quantify a compensation of power back-off when beamforming is used for the wireless devices. For example, when the power of the antenna array is evenly distributed on the wireless devices co-scheduled by the network node, the number of co-scheduled wireless devices can be taken in account. For example, if the power back-off of SU-MIMO is 6 dB, in the 2-UEs MU-MIMO case, the power back-off of first wireless device may be 3 dB (i.e., the compensation of the power back-off of first wireless device is 3 dB), and if four wireless devices are co-scheduled by the network node, it may not need to do any power back-off (i.e., the compensation of the power back-off of first wireless device is 6 dB). When the power of the antenna array is not evenly distributed on the wireless devices co-scheduled by the network node, the power back-off of first wireless device may be determined accordingly.

In an embodiment, when the power of the antenna array is evenly distributed on the wireless devices co-scheduled by the network node, the compensation of the power back-off of first wireless device may be determined by using formula (1):

$$P_{split} = 10 * \log_{10}(N) \tag{1}$$

$P_{split}$ quantifies the compensation of power back-off due to MU-MIMO scheduling. N denotes the number of wireless devices including the first wireless device that are co-scheduled by the network node. When SU-MIMO schema is selected, $P_{split}$ is 0.

It is not the case that the number of wireless devices including the first wireless device that are co-scheduled by the network node needs to be considered always. For example, if the power of the beam for the first wireless device is not changed with the number of wireless devices including the first wireless device that are co-scheduled by the network node, then the number of wireless devices including the first wireless device that are co-scheduled by the network node may not be considered when determining the value of power back-off for the first wireless device.

The estimated max power increase in the overlap area may be determined in various ways. For example, the network node may identify the channel correlation between each pair of wireless devices related to the overlap area. This can be done before or after the co-scheduling decision to specific wireless devices is made. The channel correlation between each pair of wireless devices can be estimated from the channel information by using orthogonality factor (OF), which represents the channel spatial orthogonality between a pair of wireless devices. The channel spatial orthogonality may be directly impacted by the channel correlation (and vice versa), where a high channel correlation corresponds to a low channel spatial orthogonality, which in turn corresponds to a high OF. Take FIG. 3 for example, supposed wireless devices 202, 203, 204 can be co-scheduled for data transmission at the same time, the channel correlation between each pair of the wireless devices (202 and 203, 202 and 204, 203 and 204) can be calculated. Since the wireless devices 202 and 203 are close to each other, hence their channel correlation may be higher.

In an embodiment, the OF may be calculated as the product of the channel estimate for one of the wireless devices in a pair with the conjugate of the channel estimate of the other wireless device in the pair, where this product is normalized by the product of the mathematical function norm applied to each channel estimate. As such, the OF will be a value between 0 and 1.0, where 1.0 implies no orthogonality (and high channel correlation) and 0 implies perfect orthogonality (and low channel correlation).

For example, the network node may estimate the channel correlations by explicitly calculating the channel correlations or the network node may indirectly estimate the channel correlations by calculating a variable representative of the channel correlation, e.g., the OF. For the wireless devices 202 and 203, for example, the network node estimates the correlation of the channel between the network node and the wireless device 202 and the channel between the network node and the wireless device 203. The network node repeats this estimation for each of the remaining pairs of wireless devices. While FIG. 3 only explicitly shows one pair of wireless devices 202 and 203, it will be appreciated that the network node estimates the channel correlation for each unique pair of wireless devices served by the network node.

The estimated max power increase ($P_{overlap}$) in the overlap area represents additional power increase due to beam overlap impact. For SU-MIMO, it will be 0 as there is no beam overlap. For MU-MIMO, the channel correlation check (or OF check) may be performed to determine this value.

FIG. 5a shows an example of beam overlap illustration according to an embodiment of the present disclosure. In this example, there are three UEs got co-scheduled, i.e., UE 1, UE 2 and UE 3. The beam separation for UE 2 and UE 3 is 5 degrees and the beam separation for UE 1 and UE 2 is 30 degrees, under a specific set of beamforming weights imposed (e.g., vendor specific/proprietary technology). The power in the overlap area could be about 3.1588 dB higher than that in the non-overlap areas.

FIG. 5b shows an example of beam overlap illustration according to another embodiment of the present disclosure. In this example, there are four UEs got co-scheduled, i.e., UE 1, UE 2, UE 3 and UE 4. The beam separation for two neighboring UEs is 7 degrees, under a specific set of beamforming weights imposed (e.g., vendor specific/proprietary technology). The power in the overlap area could be about 1.6777 dB higher than that in the non-overlap areas.

$P_{overlap}$ may have strong dependence on the beamforming technology details (beamforming weights design), such as the beam shape, side lobe leak. So for different vendors, this value may be varied.

It is not the case that $P_{overlap}$ needs to be considered always. For example, if the co-scheduled wireless devices have good angular separation (for example, orthogonal beams are used), $P_{overlap}$ can be ignored. This may be done by checking OF of each pair of the co-scheduled wireless devices.

Figure 6:
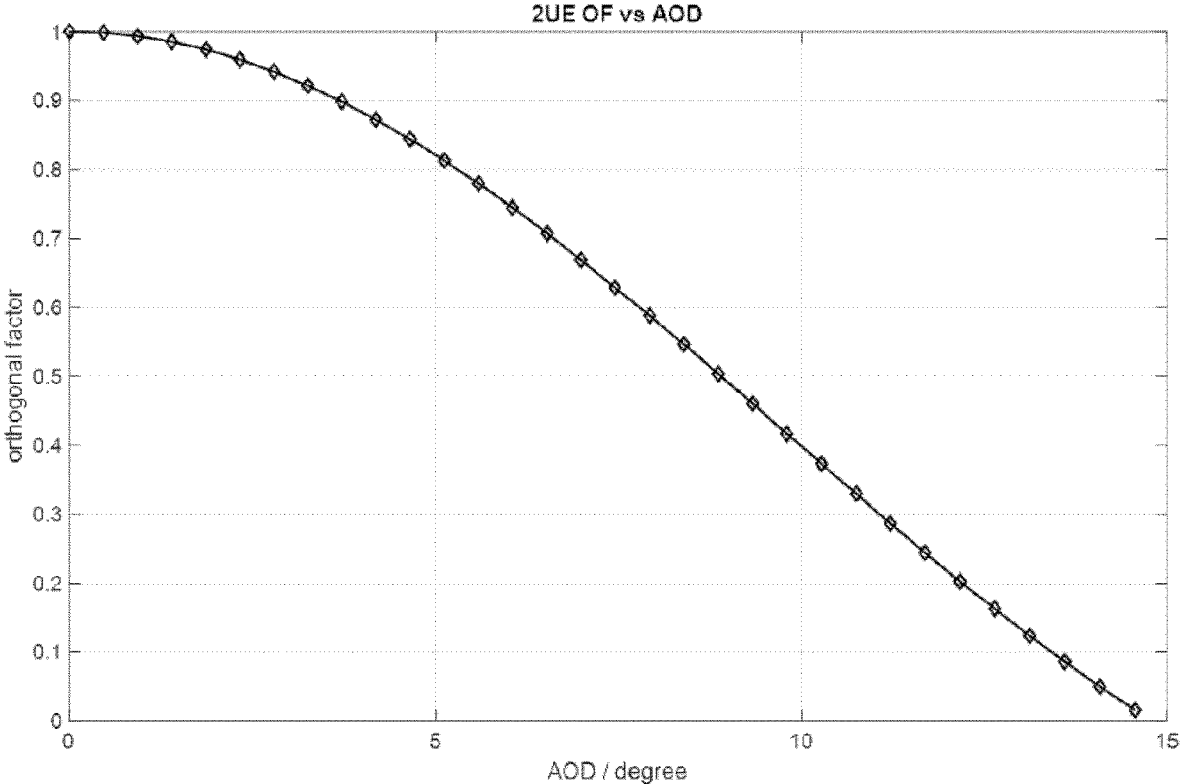
FIG. 6 shows an analysis example that how the orthogonality factor (OF) varies with the beam angular separation according to an embodiment of the present disclosure.

FIG. 6 shows an analysis example that how the OF varies with the beam angular separation. AOD denotes angle of departure. Similar to $P_{overlap}$, the OF also has strong dependence on the beamforming implementation details and is differentiated from different vendors.

In an embodiment, the estimated max power increase in the overlap area may be determined by a table indicating an association between the estimated max power increase in the overlap area and at least one beamforming parameter.

In an embodiment, the estimated max power increase in the overlap area or the table may be determined by simulation or testing. For example, the estimated max power increase in the overlap area may be determined by using a look-up table configured to describe an association between the estimated max power increase in the overlap area and at least one beamforming parameter. The beamforming parameter can be any suitable parameter which can be determined or obtained by the network node.

In an embodiment, the at least one beamforming parameter may comprise at least one of an orthogonality factor between two or more beams for respective wireless devices in the overlap area.

For example, the following mapping table can be created, in which the mapping from different OF value to corresponding $P_{overlap}$ is stored. By looking up this mapping table, the network node can determine, for each OF value, what the value $P_{overlap}$ should be applied for beam overlap penalty.

| OF value | P_overlap (dB) |
|---|---|
| 0~0.3 | 0 (means it doesn't need to consider overlap) |
| 0.3~0.5 | 1.4 |
| 0.5~0.7 | 1.7 |
| 0.7~0.8 | 2.3 |
| 0.8~1.0 | 3 (but generally speaking it's not suggested to transmit data at the same time if OF so high) |

It is noted that the mapping table is only for the purpose of illustration. In fact, for different bands, frequencies, antenna array arrangement, and spacing between antennas, the $P_{overlap}$ may be different.

It is noted that the mapping table can be used to implement fast power back-off. In fact, the correspondence between $P_{overlap}$ and OF can be of any other suitable forms. (e.g., continuous functions, discontinuous functions, etc.).

The mapping table may be a summary of many simulation results or real equipment evaluation. For example, it can simulate several times. In each time, it may try different angles between UEs (such as 2.5/5/7/10/12/15 degrees), it can draw the power of $P_{overlap}$ under the specific frequency/antenna array. Finally, a mathematical method may be used to fit the amount of back power in each interval.

In an embodiment where there is not an overlap area related to the first wireless device and the power of the beam for the first wireless device is changed with the number of wireless devices including the first wireless device that are co-scheduled by the network node, the network node may determine the value of power back-off for the first wireless device based on the number of wireless devices including the first wireless device that are co-scheduled by the network node.

In an embodiment where there is an overlap area related to the first wireless device and the power of the beam for the first wireless device is not changed with the number of wireless devices including the first wireless device that are co-scheduled by the network node, the network node may determine the value of power back-off for the first wireless device based on the estimated max power increase in an overlap area where two or more beams overlap.

In an embodiment where there is an overlap area related to the first wireless device and the power of the beam for the first wireless device is changed with the number of wireless devices including the first wireless device that are co-scheduled by the network node, the network node may determine the value of power back-off for the first wireless device based on the number of wireless devices including the first wireless device that are co-scheduled by the network node and the estimated max power increase in an overlap area where two or more beams overlap.

In an embodiment, the value of power back-off for the first wireless device is determined further based on effective isotropic radiated power (EIRP) max and EIRP limit, wherein the EIRP max indicates a maximum value of EIRP of the first wireless device and the EIRP limit indicates a limit value of EIRP.

For example, in order to calculate the required transmission power for downlink data transmission and control the EIRP within the limit. This may be done by calculating how much power (in unit of dB) should be reduced from the total configured transmission power.

For example, the maximum value of EIRP (or max EIRP) may be normally represented as: $EIRP_{max}=P+G$.
Where:

P is the total configured transmission power.

G is the max antenna gain or beamforming gain from the antenna array. It may depend on the number of antennas in the antenna array and detailed beamforming algorithms (e.g., beamforming weight design).

In other embodiments, the maximum value of EIRP may be normally represented as: $EIRP_{max}=P+G-L$, where L is the cable losses (possibly including antenna mismatch). Often the cable losses L can be neglected, as they are generally a small fraction of a dB.

Those two factors P and G are known to a specific radio product under a certain transmission power configuration. By reducing P while keeping G unchanged, the EIRP could be reduced and within the limit.

The delta between $EIRP_{max}$, and $EIRP_{unit}$ (EIRP limit or a limit value of EIPR, for example the max EIRP allowed by operators) is right the power back-off which may be applied for SU-MIMO scheduling since all the configured transmission power may be assigned to a single wireless device.

As described above, the network node may determine the value of power back-off for the first wireless device based on at least one of the number of wireless devices including the first wireless device that are co-scheduled by the network node and the estimated max power increase in the overlap area where two or more beams overlap.

Considering the factors mentioned above, the power back-off formula may be given as follow:

$$P_{back\_off}=EIRP_{max}-EIRP_{limit}-P_{split}+P_{overlap} \quad\quad (2)$$

For the co-scheduled wireless devices, the correlation check should be performed to determine if there is overlap areas.

The formula (2) may be applicable for some scenarios such as SU-MIMO or MU-MIMO. In MU-MIMO case, no matter how many co-scheduled wireless devices, no matter if there is beam overlap, the formula (2) can work and resolve at least one of the problems mentioned above.

In an embodiment, the first wireless device is in a multiuser multiple input multiple output, MU-MIMO, mode.

In an embodiment, the value of power back-off for the first wireless device is determined in a scheduling interval.

With reference to FIG. 4, at block 406, the network node may transmit message or data over the beam for the first wireless device. An output power of the beam for the first wireless device is controlled based on the value of power back-off for the first wireless device. For example, the message or data may be any suitable signaling messages or user data. For example, the value of power back-off may be sent to the antenna array or radio power control unit. The output power of the beam may be dynamically controlled (such as changed and/or reduced) in a scheduling interval according to the value of power back-off. In addition, the output power of the beam for the first wireless device may be controlled based on the value of power back-off for the first wireless device and any other suitable power control solution.

In an embodiment, the network node is a base station and/or the wireless devices are terminal devices.

FIG. 7 shows a flowchart of a method according to another embodiment of the present disclosure, which may be performed by an apparatus implemented in/as a first wireless device or communicatively coupled to the first wireless device. As such, the apparatus may provide means or modules for accomplishing various parts of the method 700 as well as means for accomplishing other processes in conjunction with other components. For some parts which have been described in the above embodiments, detailed description thereof is omitted here for brevity.

At block 702, optionally, the first wireless device may transmit at least one reference signal to the network node. As described above, the channel information of the first wireless device may be determined by evaluating the cell reference signal or UE-specific reference signal from the first wireless device.

At block 704, the first wireless device may receive a message or data over a beam for the first wireless device from a network node. As described above, an output power of the beam for the first wireless device may be controlled based on a value of power back-off for the first wireless device. The value of power back-off for the first wireless device may be determined based on at least one of a number of wireless devices including the first wireless device that are co-scheduled by the network node and an estimated max power increase in an overlap area where two or more beams are to be overlapped, wherein one of the two or more beams is for the first wireless device.

Some embodiments herein may resolve the power restriction problem by dynamically adjusting the antenna power, according to the MIMO manner (i.e. SU or MU) and the number of MU-MIMO UEs. In this way, the UE receiving power may not be too low to impact its performance. Some embodiments herein may calculate the co-efficiency of beams between each UE pair, to avoid too much power gain in case two or several UEs are very close so that the total EIRP may exceed the predefined limit.

In some embodiments herein, the network node may get the UE channel information when antenna array receiving the reference signal. (Such as the phase & power difference per different antennas, UE location, etc.); calculate the co-efficiency of channels of every 2 UEs to predict how much overlap if beamforming is utilized to send data to these UEs; calculate the value of power back-off according to the number of UE and the co-efficiency consequently; and implement the power back-off to each antenna of the antenna array. In this way, the UE receiving power may be controlled to a suitable level.

FIG. 8a is a block diagram showing an apparatus suitable for practicing some embodiments of the disclosure. For example, any one of the network node and the first wireless device described above may be implemented as or through the apparatus 800.

The apparatus 800 comprises at least one processor 821, such as a digital processor (DP), and at least one memory (MEM) 822 coupled to the processor 821. The apparatus 820 may further comprise a transmitter TX and receiver RX 823 coupled to the processor 821. The MEM 822 stores a program (PROG) 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the network node, the memory 822 contains instructions executable by the processor 821, whereby the network node operates according to the method 400 as described in reference to FIG. 4.

In an embodiment where the apparatus is implemented as or at the first wireless device, the memory 822 contains instructions executable by the processor 821, whereby the first wireless device operates according to the method 700 as described in reference to FIG. 7.

Figure 8B:
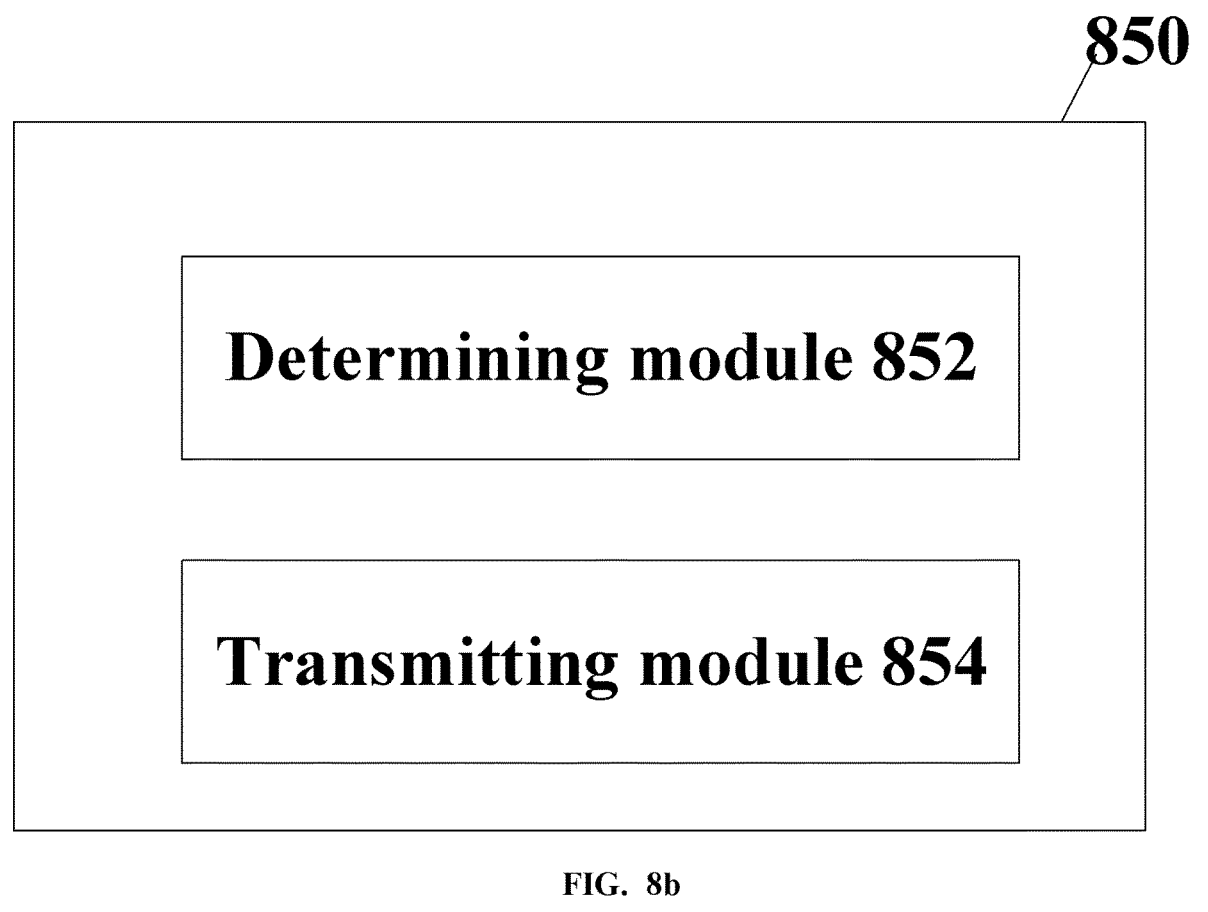

FIG. 8b is a block diagram showing a network node according to an embodiment of the disclosure. As shown, the network node 850 comprises a determining module 852 and a transmitting module 854. The determining module 852 may be configured to determine a value of power back-off for a first wireless device based on at least one of a number of wireless devices including the first wireless device that are co-scheduled by the network node and an estimated max power increase in an overlap area where two or more beams are to be overlapped, wherein one of the two or more beams is for the first wireless device. The transmitting module 854 may be configured to transmit message or data over the beam for the first wireless device, wherein an output power of the beam for the first wireless device is controlled based on the value of power back-off for the first wireless device.

Figure 8C:
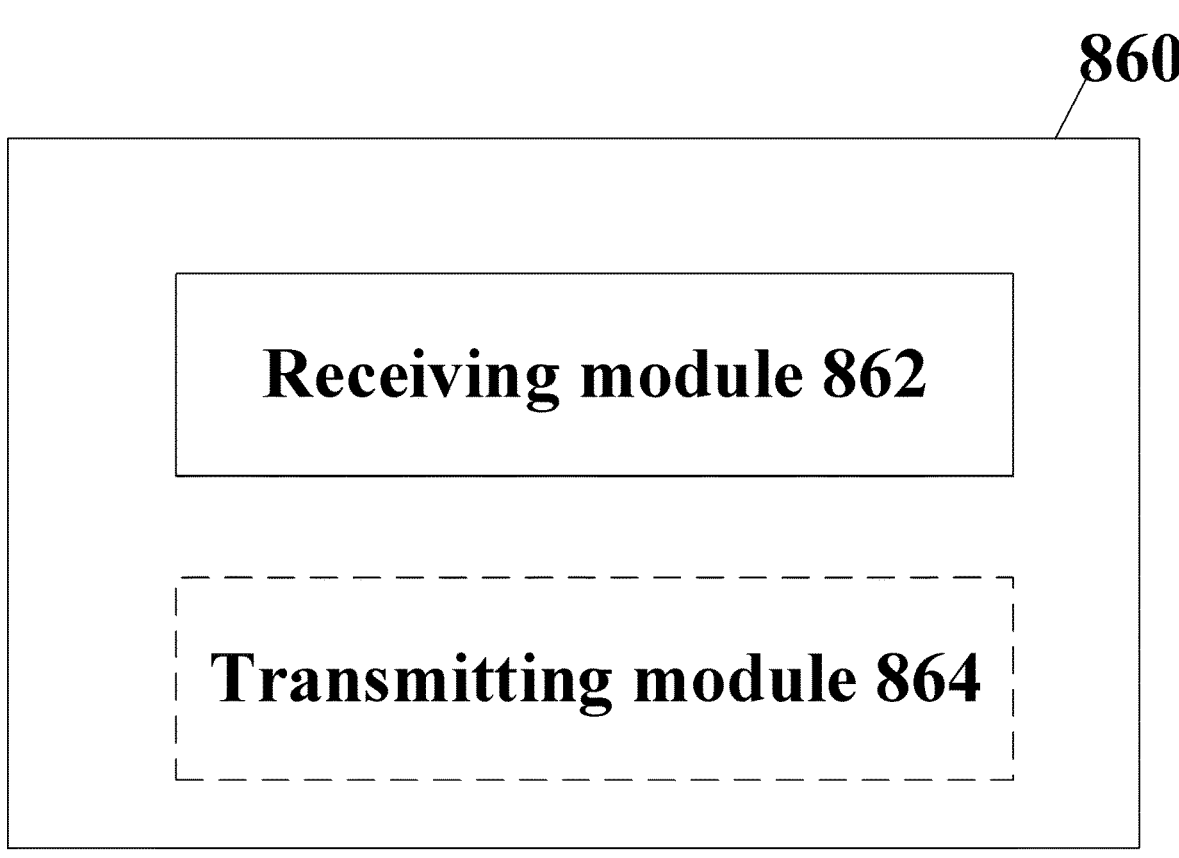
FIG. 8c is a block diagram showing a first wireless device according to an embodiment of the disclosure.

FIG. 8c is a block diagram showing a first wireless device according to an embodiment of the disclosure. As shown, the first wireless device 860 comprises a receiving module 862. The receiving module 862 may be configured to receive a message or data over a beam for the first wireless device from a network node. An output power of the beam for the first wireless device is controlled based on a value of power back-off for the first wireless device. The value of power back-off for the first wireless device is determined based on at least one of a number of wireless devices including the first wireless device that are co-scheduled by the network node, and an estimated max power increase in an overlap area where two or more beams are to be overlapped, wherein one of the two or more beams is for the first wireless device. The first wireless device 860 may further comprise a transmitting module 864 (optionally). The transmitting module 864 may be configured to transmit at least one reference signal to the network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the network node or the first wireless device may not need a fixed processor or memory. The introduction of virtualization technology and network computing technology may improve the usage efficiency of the network resources and the flexibility of the network.

Further, the exemplary overall commutation system including the terminal device and the network node such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
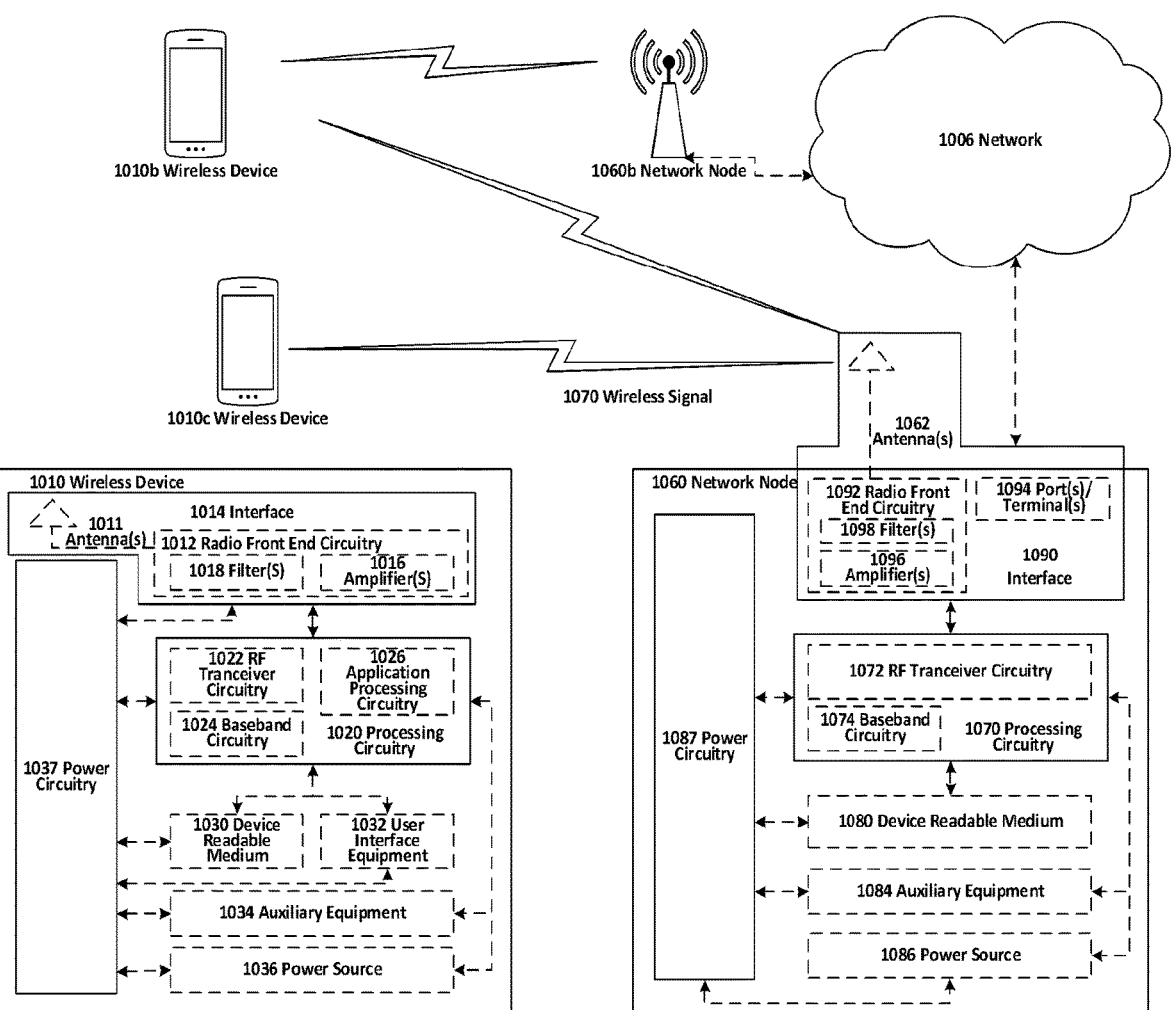
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry

1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equip-ment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, convert-ing, or other modification to the power from power source 1036 to make the power suitable for the respective compo-nents of WD 1010 to which power is supplied.

Figure 10:
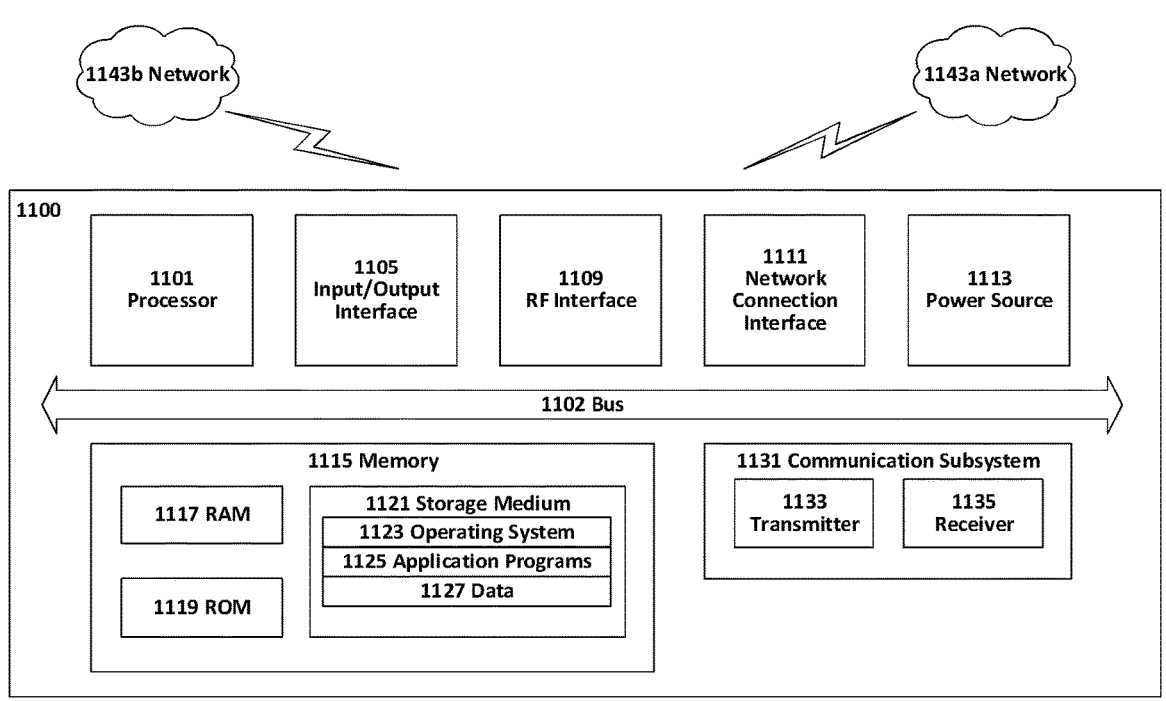
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, trans-ceivers, transmitters, receivers, etc.

In FIG. 10, processing circuitry 1101 may be configured to process computer instructions and data. Processing cir-cuitry 1101 may be configured to implement any sequential state machine operative to execute machine instructions stored as machine-readable computer programs in the memory, such as one or more hardware-implemented state machines (e.g., in discrete logic, FPGA, ASIC, etc.); pro-grammable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combi-nation thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a micro-phone, and an optical sensor.

In FIG. 10, RF interface 1109 may be configured to provide a communication interface to RF components such as a transmitter, a receiver, and an antenna. Network con-nection interface 1111 may be configured to provide a communication interface to network 1143*a*. Network 1143*a* may encompass wired and/or wireless networks such as a local-area network (LAN), a wide-area network (WAN), a computer network, a wireless network, a telecommunica-tions network, another like network or any combination thereof. For example, network 1143*a* may comprise a Wi-Fi network. Network connection interface 1111 may be con-figured to include a receiver and a transmitter interface used to communicate with one or more other devices over a communication network according to one or more commu-nication protocols, such as Ethernet, TCP/IP, SONET, ATM, or the like. Network connection interface 1111 may imple-ment receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
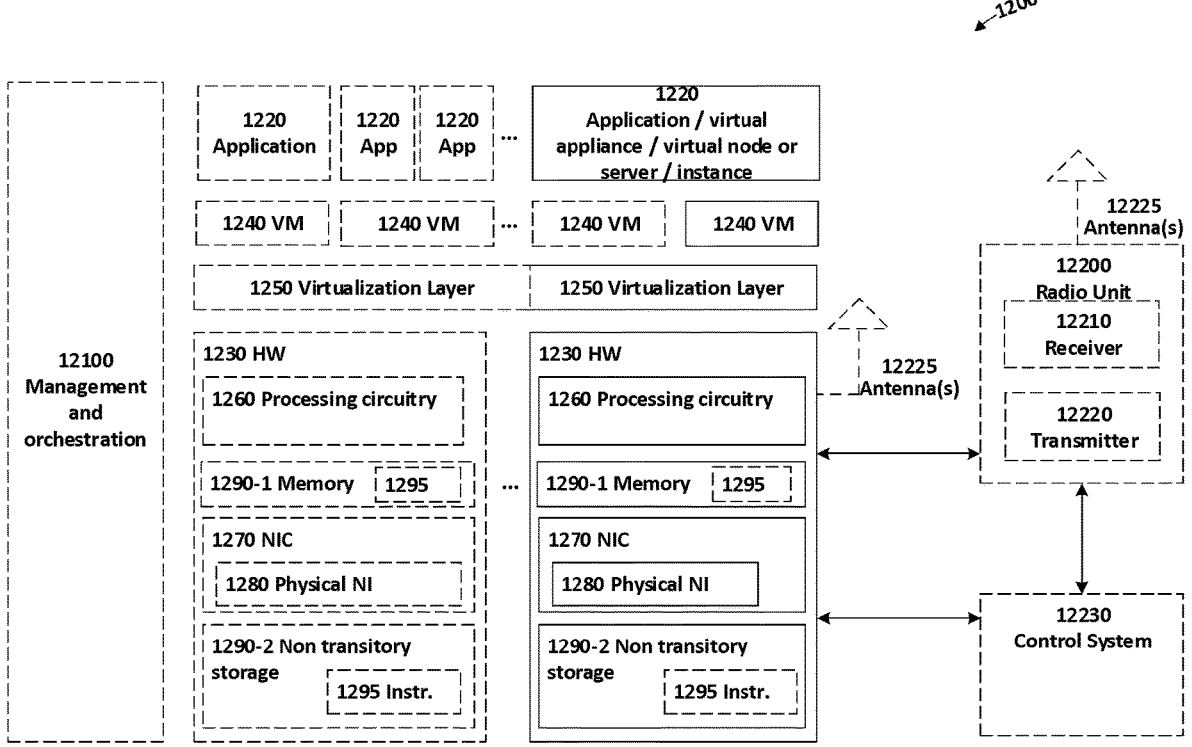
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
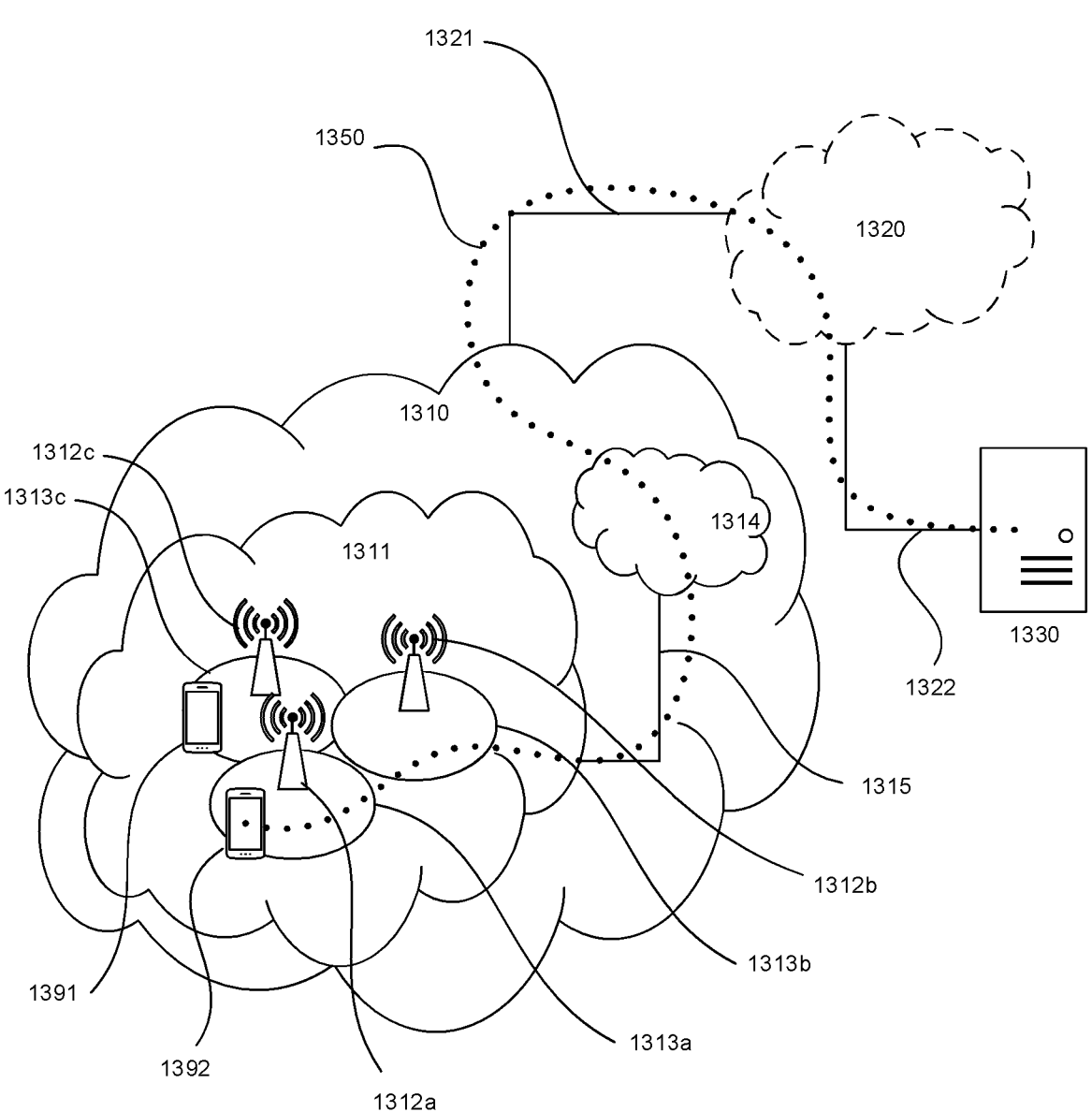
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
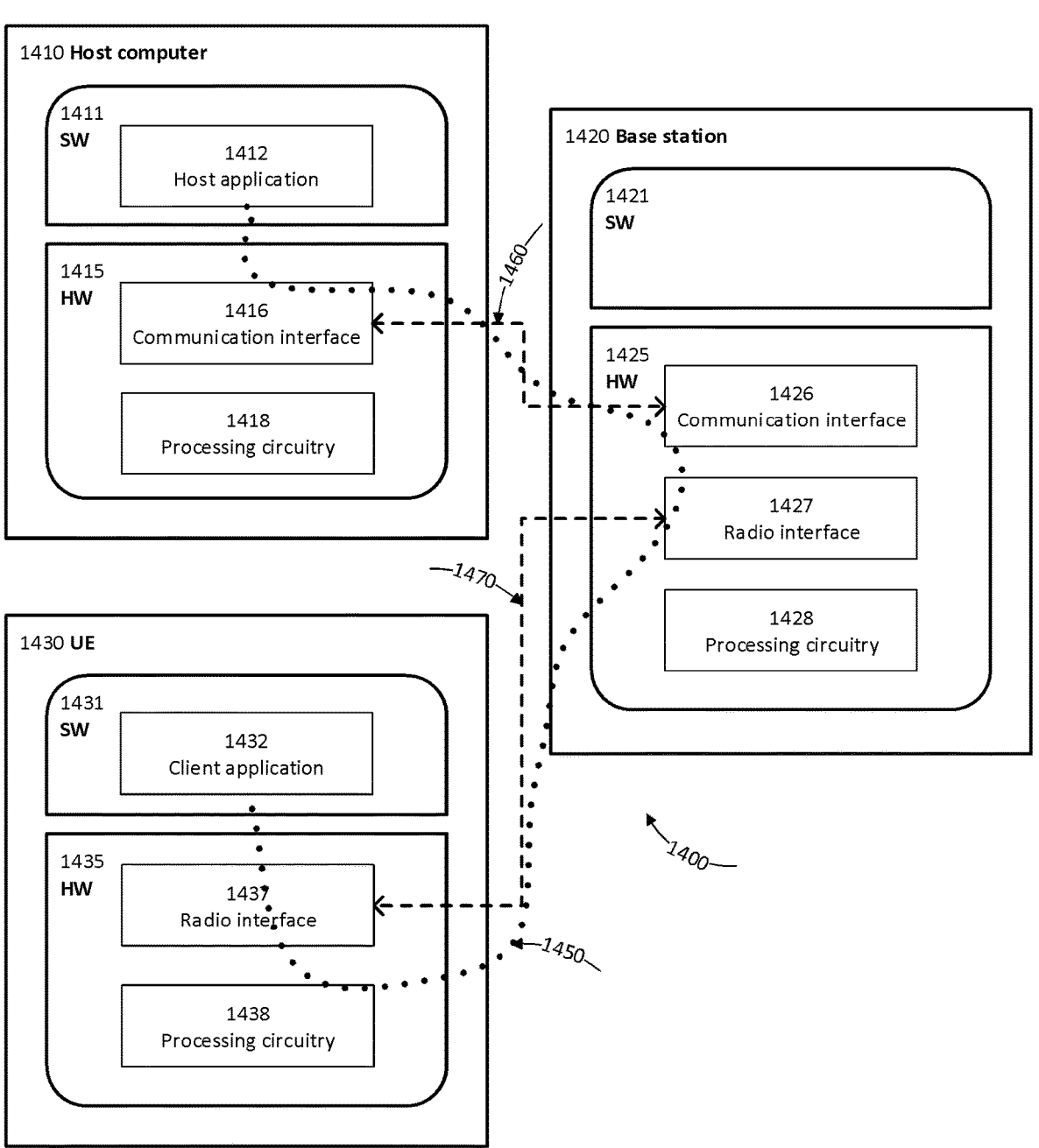
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312a, 1312b, 1312c and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
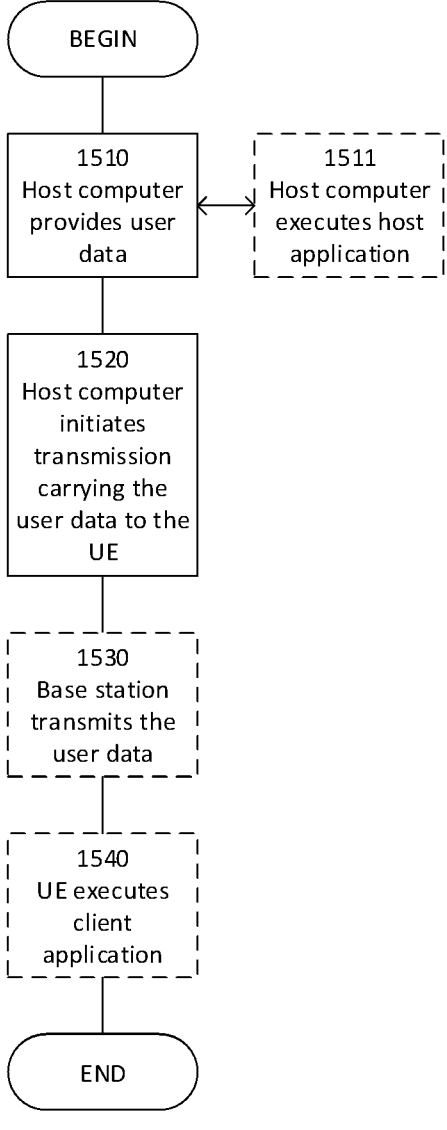
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
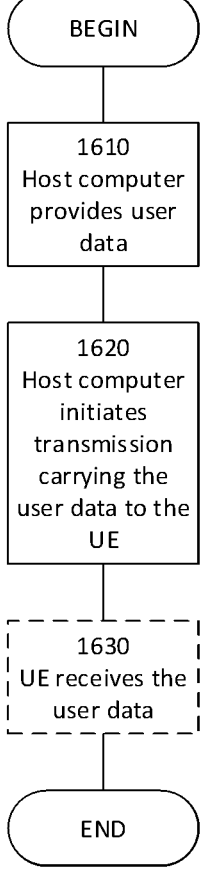
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
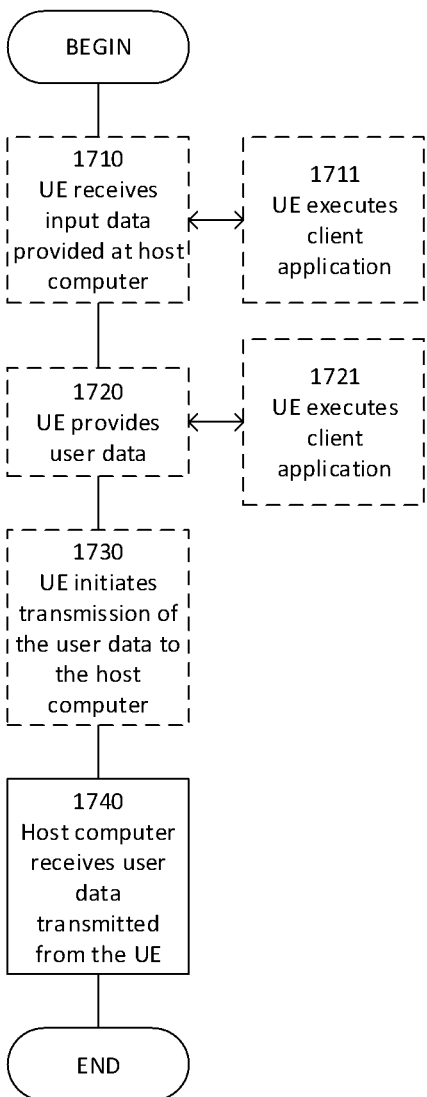
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In sub step 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
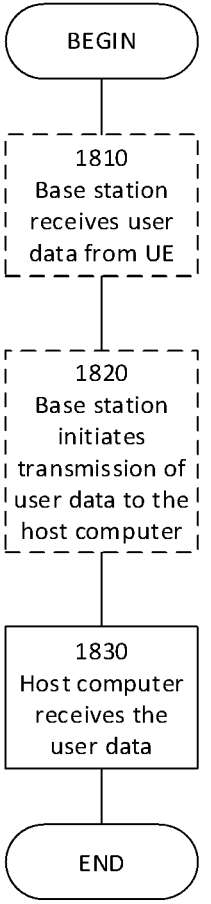
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Embodiments herein afford many advantages, of which a non-exhaustive list of examples follows. In some embodiments herein, TM7/8/9 SU-MIMO (beamforming) may be allowed to improve cell edge performance, compared to using TM3/4. In some embodiments herein, MU-MIMO may not be limited by the number of paired UEs. Even there are only 2 UEs, MU-MIMO can still work. In some embodiments herein, in the case of MU-MIMO, each UE can reach its max allowed EIRP regardless of how many UEs got paired, to ensure its performance. In some embodiments herein, even in the beam overlap areas (e.g., some UEs are very close to each other), the total EIRP may be still under control. In some embodiments herein, no blindly overlap penalty may be applied. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a network node, the method comprising:

determining a value of power back-off for a first wireless device of a plurality of wireless devices, wherein the plurality of wireless devices are co-scheduled by the network node for multi-user multiple input multiple output (MU-MIMO) transmissions using two or more beams wherein a first beam of the two or more beams is for the first wireless device, the value of power back-off being determined based on at least one of:

a number of the plurality of wireless devices including the first wireless device, and an estimated increase max power owing to overlap of the two or more beams in an overlap area, wherein the estimated increase in max power in the overlap area is determined by simulation or testing; and transmitting the MU-MIMO transmissions including transmitting a message or data over the first beam for the first wireless device, wherein an output power of the first beam for the first wireless device is controlled based on the value of power back-off for the first wireless device.

2. The method according to claim 1, wherein the value of power back-off for the first wireless device is determined further based on effective isotropic radiated power, EIRP, max and EIRP limit, wherein the EIRP max indicates a maximum value of EIRP of the first wireless device and the EIRP limit indicates a limit value of EIRP.

3. The method according to claim 1, wherein the number of wireless devices including the first wireless device is used to quantify a compensation of power back-off when beamforming is used for the wireless devices.

4. The method according to claim 1, wherein the estimated increase in max power in the overlap area is determined by a table indicating an association between the estimated increase in max power in the overlap area and at least one beamforming parameter.

5. The method according to claim 4, wherein the at least one beamforming parameter comprises at least one of:

an orthogonality factor between two or more beams for respective wireless devices in the overlap area; and a beam angular separation.

6. The method according to claim 1, wherein the value of power back-off for the first wireless device is determined in a scheduling interval.

7. The method according to claim 1, further comprising: determining channel information of the wireless devices including the first wireless device.

8. The method according to claim 1, wherein the network node is a base station and/or the wireless devices are terminal devices.

9. A method implemented at a first wireless device, the method comprising:

receiving multi-user multiple input multiple output (MU-MIMO) transmissions including receiving message or data over a first beam for the first wireless device from a network node;

wherein an output power of the first beam for the first wireless device is controlled based on a value of power back-off for the first wireless device, wherein the value of power back-off for the first wireless device of a plurality of wireless devices, wherein the plurality of wireless devices are co-scheduled by the network node for MU-MIMO transmissions using two or more beams wherein the first beam of the two or more beams is for the first wireless device, the value of power back-off is determined based on at least one of:

a number of the plurality of wireless devices including the first wireless device, and an estimated increase max power owing to overlap of the two or more beams in an overlap areas, wherein the estimated increase in max power increase in the overlap area is determined by simulation or testing.

10. The method according to claim 9, wherein the value of power back-off for the first wireless device is determined further based on effective isotropic radiated power, EIRP, max and EIRP limit, wherein the EIRP max indicates a maximum value of EIRP of the first wireless device and the EIRP limit indicates a limit value of EIRP.

11. The method according to claim 9, wherein the number of wireless devices including the first wireless device is used to quantify a compensation of power back-off when beamforming is used for the wireless devices.

12. The method according to claim 9, wherein the estimated increase in max power in the overlap area is determined by a table indicating an association between the estimated increase in max power in the overlap area and at least one beamforming parameter.

13. The method according to claim 12, wherein the at least one beamforming parameter comprises at least one of:

an orthogonality factor between two or more beams for respective wireless devices in the overlap area; and a beam angular separation.

14. The method according to claim 9, wherein the value of power back-off for the first wireless device is determined in a scheduling interval.

15. A network node, comprising:

a processor; and a memory, the memory containing instructions executable by the processor, whereby the network node is operative to:

determine a value of power back-off for a first wireless device of a plurality of wireless devices, wherein the plurality of wireless devices are co-scheduled by the network node for multi-user multiple input multiple output (MU-MIMO) transmissions using two or more beams wherein a first beam of the two or more beams is for the first wireless device, the value of power back-off being determined based on at least one of:

a number of the plurality of wireless devices including the first wireless device, and an estimated increase max power owing to overlap of the two or more beams in an overlap area, wherein the estimated increase in max power increase in the overlap area is determined by simulation or testing; and transmit the MU-MIMO transmissions including transmitting a message or data over the first beam for the first wireless device, wherein an output power of the first beam for the first wireless device is controlled based on the value of power back-off for the first wireless device.

* * * * *